(12) United States Patent
Yip et al.

(10) Patent No.: US 7,072,133 B1
(45) Date of Patent: Jul. 4, 2006

(54) SERVO MARK VERIFY HEAD

(75) Inventors: Yung Yip, Afton, MN (US); Stephen J. Rothermel, Roseville, MN (US)

(73) Assignee: Imation Corp., Oakdale, MN (US)

( * ) Notice: Subject to any disclaimer, the term of this patent is extended or adjusted under 35 U.S.C. 154(b) by 627 days.

(21) Appl. No.: 09/978,812

(22) Filed: Oct. 15, 2001

(51) Int. Cl.
*G11B 5/09* (2006.01)
*G11B 5/265* (2006.01)
*G11B 5/33* (2006.01)

(52) U.S. Cl. .................. 360/53; 360/121; 360/319
(58) Field of Classification Search ............... 360/53, 360/55, 76, 77.07, 119, 121, 120
See application file for complete search history.

(56) References Cited

U.S. PATENT DOCUMENTS

| | | | |
|---|---|---|---|
| 3,665,118 A | 5/1972 | Cooper, Jr. | |
| 3,686,649 A | 8/1972 | Behr | |
| 4,007,493 A | 2/1977 | Behr et al. | |
| 4,149,198 A | 4/1979 | Behr et al. | |
| 4,321,634 A | 3/1982 | Lehureau | |
| 4,347,534 A | 8/1982 | Kimura | |
| 4,454,549 A | 6/1984 | Pennington | |
| 4,472,750 A | 9/1984 | Klumpp et al. | |
| 4,498,129 A | 2/1985 | Velazquez | |
| 4,531,170 A * | 7/1985 | Takei et al. | 360/119 |
| 4,549,232 A | 10/1985 | Axmear et al. | |
| 4,586,094 A | 4/1986 | Chambors et al. | |
| 4,587,579 A | 5/1986 | Cocke et al. | |
| 4,598,327 A | 7/1986 | Jen et al. | |
| 4,685,005 A * | 8/1987 | Fields, Jr. | 360/53 |
| 4,967,301 A * | 10/1990 | Lopez et al. | 360/128 |
| 5,003,412 A | 3/1991 | Bizjak et al. | |
| 5,021,910 A * | 6/1991 | Murakami | 360/123 |
| 5,055,951 A | 10/1991 | Behr | |
| 5,119,248 A | 6/1992 | Bizjak et al. | |
| 5,132,861 A * | 7/1992 | Behr et al. | 360/121 |
| 5,223,994 A | 6/1993 | Behr et al. | |
| 5,293,281 A | 3/1994 | Behr et al. | |
| 5,321,570 A * | 6/1994 | Behr et al. | 360/121 |
| 5,689,384 A * | 11/1997 | Albrecht et al. | 360/77.12 |
| 5,694,277 A * | 12/1997 | Lee | 360/119 |
| 5,930,065 A | 7/1999 | Albrecht et al. | |
| 5,995,315 A | 11/1999 | Fasen | |
| 6,021,013 A | 2/2000 | Albrecht et al. | |
| 6,111,708 A * | 8/2000 | Jewell et al. | 360/31 |
| 6,154,330 A | 11/2000 | Nakagawa | |
| 6,169,640 B1 | 1/2001 | Fasen | |
| 6,362,934 B1 * | 3/2002 | Hungerford et al. | 360/121 |
| 6,469,854 B1 * | 10/2002 | Gill et al. | 360/53 |
| 6,678,116 B1 * | 1/2004 | Dugas | 360/122 |

FOREIGN PATENT DOCUMENTS

| | | |
|---|---|---|
| EP | 0 690 442 A2 | 1/1996 |
| EP | 0 690 442 A3 | 1/1996 |

\* cited by examiner

*Primary Examiner*—Wayne Young
*Assistant Examiner*—Daniell L. Negrón
(74) *Attorney, Agent, or Firm*—Eric D. Levinson

(57) ABSTRACT

The invention presents techniques for verifying patterns, such as time-based servo marks, recorded on magnetic media. Patterns of this kind can be recorded on a magnetic medium using a recording head that includes a surface having a flux gap with a defined shape. The patterns may be verified with a verify head, having a surface with a flux gap with the defined shape or part of the defined shape. The verify head may include two or more ferromagnetic cores, with a flux gap associated with each core. Each core can independently verify part of the recorded pattern.

24 Claims, 8 Drawing Sheets

SERVO MARK VERIFY HEAD

TECHNICAL FIELD

The invention relates to recording and reading from magnetic storage media, and in particular, to verification of servo tracks in magnetic storage media.

BACKGROUND

Magnetic media are used for storage and retrieval of data, and come in many forms, such as magnetic tape and magnetic disks. Magnetic tape remains an economical medium for storing large amounts of data. A write/read head assembly, which includes one or more write/read transducer heads, reads data from and writes data to the magnetic medium. The data stored on the medium are usually organized into "data tracks," and the transducer heads write data to and read data from the data tracks.

Data tracks on magnetic tape are generally parallel to each other, and often are oriented longitudinally on the tape. The head assembly is usually oriented transverse to the path of the magnetic tape so that the transducer heads move laterally across the width of the tape to access the tracks.

Data tracks on magnetic disks are typically arranged circumferentially. The head assembly is usually oriented so that the transducer heads move laterally across the tracks.

For efficient reading and writing, a transducer head must be accurately positioned to read from or write to a particular data track. A servo control system typically is provided to control the positioning of the head relative to the data tracks.

The medium often includes specialized tracks, called "servo tracks," to serve as references or landmarks for the servo control system. The servo tracks are sensed by a servo read head, which may be narrower than the servo track. Once a particular servo track is located by the servo read head, a data track can be located on the magnetic medium according to the data track's displacement from the servo track.

Servo tracks can assume many forms. Conventional servo tracks store magnetic flux transitions of varying phases or frequencies. Time-based servo marks, by contrast, apply a different approach. Time-based servo marks are arranged in a series of patterns. A simple form of a pattern consists of a pair of marks, but patterns may include more than two marks. In many cases, the marks are not coincident with each other, nor are they parallel. Rather, the marks are angularly offset from one another, in a pattern such as a diamond or zigzag.

SUMMARY

The present invention presents techniques for verifying time-based servo marks. As a servo read head reads a time-based servo mark, the servo read head generates a pulse. Because the marks are angularly offset from one another, the timing between pulses is indicative of the location of the servo read head relative to the servo mark. The timing of the position signal pulses varies continuously as the servo read head is moved across the width of the servo mark.

The timing of pulses generated by the servo read head is decoded by appropriate circuitry. The decoder can determine from the timing of the pulses whether the servo read head is reading near an edge of the servo mark, for example, or whether the servo read head is reading in the center of the servo mark.

Time-based servo marks are usually recorded on the magnetic medium as a part of the manufacturing process. Because of the importance of servo marks as landmarks, the manufacturer places the servo marks on the medium with great precision. A specialized write head is used to record the marks. After the marks are recorded, the manufacturer typically checks the marks, in a process known as "verification."Verification evaluates qualities of the marks such as pattern, position, amplitude, dropout rate and consistency of the marks.

Typically, verification involves reading the servo track with a verifying servo read head. Conventional verifying heads are usually too small to verify the entire width (also called the "full band") of a time-based servo mark. Larger heads may not be able to provide full band verification either, because time-based servo marks typically include marks made at angles that are neither parallel to nor perpendicular to the core gap of the head. The present invention avoids these difficulties and allows verification of the full band of a time-based servo mark.

Patterns such as time-based servo marks can be recorded on a magnetic medium using a recording head that includes a surface having a flux gap. The flux gap has a defined shape, and when current is supplied to the recording head, a mark having the defined shape is magnetically recorded on the medium. A verify head, having a surface with a flux gap of the defined shape, may be used to sense the recorded mark. Under the principle of magnetic recording reciprocity, the same kind of head used to record the mark can also be used to verify the mark.

Accordingly, in one embodiment the invention presents a system comprising a recording head, the recording head including a surface having a flux gap having a defined shape, and a verify head, the verify head including a surface having a flux gap having the defined shape, or a part of the defined shape.

In another embodiment, the invention presents a method comprising recording a pattern to a magnetic medium using a recording head, the recording head including a surface having a flux gap having a defined shape, and sensing the pattern on the magnetic medium using a verify head, the verify head including a surface having a flux gap having the defined shape, or a part of the defined shape.

In a further embodiment, the invention presents a device, including a first ferromagnetic core, the first ferromagnetic core having a first core gap, and a second ferromagnetic core adjacent to the first ferromagnetic core, the second ferromagnetic core having a second core gap. The device also includes a magnetically permeable surface proximal to the first ferromagnetic core and proximal to the second ferromagnetic core, the magnetically permeable surface having a first flux gap associated with the first core gap and a second flux gap associated with the second core gap.

The device can serve as a verify head, with each core verifying part of a recorded pattern. The cores may be monolithic. Each core may include a coil that generates a current in response to a mark that passes in proximity to the flux gap associated with the core. The cores may be magnetically separated by a non-magnetic spacer or a space.

In an additional embodiment, the invention presents a device including a first verify head, a non-magnetic spacer transversely affixed to the first verify head, and a second verify head transversely affixed to the non-magnetic spacer. Independently operating verify heads may be arranged in this way to form a verifier head assembly.

The details of one or more embodiments of the present invention are set forth in the accompanying drawings and the description below. Other features, objects, and advantages of the present invention will be apparent from the description and drawings, and from the claims.

DETAILED DESCRIPTION

Figure 1:
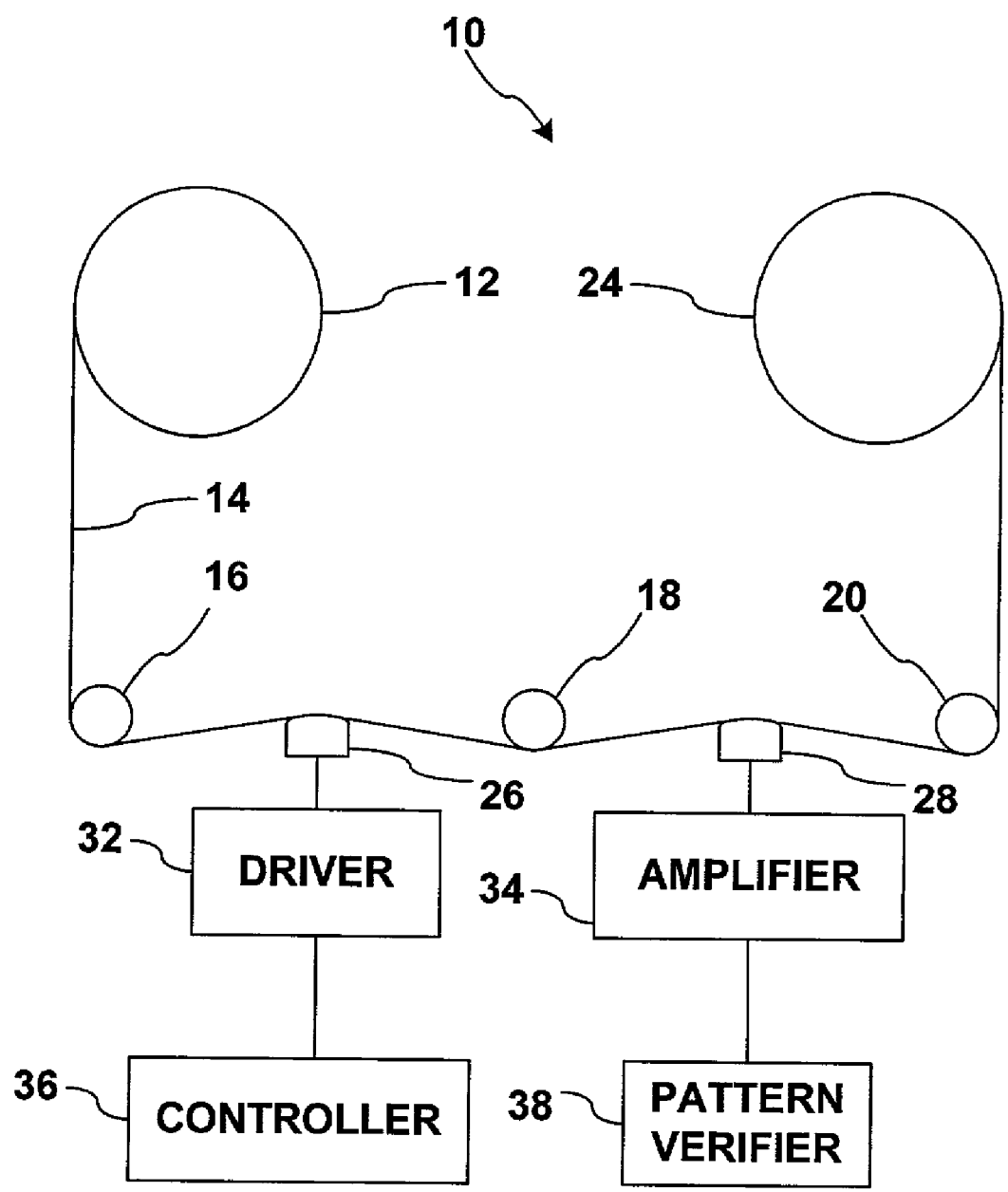
FIG. 1 is a schematic representation of a system for recording and verifying servo marks.

FIG. 1 shows a system 10 for recording and verifying patterns on magnetic tape 14. For purposes of illustration, it will be assumed that the patterns are time-based servo marks. Time-based servo marks are used by a servo read head to determine the position of the servo read head and associated write/read transducer heads. Time-based servo marks usually comprise two or more servo lines angularly offset from one another. When the servo read head reads a time-based servo mark, the servo read head generates a pulse. Because the servo lines are angularly offset from one another, the timing between pulses is indicative of the location of the servo read head relative to the servo mark. The timing of the position signal pulses varies continuously as the servo read head is moved across the width of the servo mark.

Tape 14 is dispensed from dispensing reel 12 and is passed by recording head 26, which records the servo marks. Tape 14 then passes verify head 28, which reads the servo marks for purposes of verification. In this manner, servo marks can be recorded and verified in a single pass of tape 14. Tape 14 is taken up by take-up reel 24. If an error in the servo marks is detected, the error may be noted so that portions of the medium having poor quality marks can be easily identified at a later time.

Guides 16, 18 and 20 steer tape 14 past heads 26 and 28. Guides 16, 18 and 20 and capstans and vacuum columns (not shown in FIG. 1) may also measure and regulate the speed and tension of tape 14 as tape 14 passes heads 26 and 28.

Recording head 26, as will be described in more detail below, is an electromagnet. In particular, recording head 26 may include a ferromagnetic C-shaped core wrapped with a wire coil. When current flows through the coil, magnetic flux flows through the core and a magnetic field forms. The field penetrates tape 14 as tape 14 passes the head, resulting in residual magnetization of tape 14. Tape 14 magnetically records the effect of the flux and the magnetic field.

Driver 32 causes current to flow in the coil, thereby energizing recording head 26 and generating the magnetic field. The driver may, for example, send pulses of current to recording head 26, energizing recording head 26 with each pulse. Controller 36 regulates driver 32 by, for example, regulating the timing and intensity of the current pulses.

After recording head 26 writes a servo mark to tape 14, tape 14 advances past verify head 28. Verify head 28 detects the servo mark and generates a signal as a function of the detection. The signal generated by verify head 28 may be in the form of a current or a voltage. Amplifier 34 amplifies the signal and passes the amplified signal to pattern verifier 38. Amplifier 34 may also change a current signal to an amplified voltage signal or a voltage signal to an amplified current signal.

Pattern verifier 38 analyzes the amplified signal to determine if the servo mark has the proper qualities, such as pattern, position, amplitude, dropout rate and consistency with other marks. If pattern verifier 38 detects an unacceptable servo mark, pattern verifier 38 may note the error, and/or may initiate action to mark the unacceptable portions of tape 14.

A system similar to system 10 may be used for recording and verifying servo marks on magnetic disks. In particular, a system adapted to magnetic disks may include a recording head, a verify head, a driver, a controller, an amplifier and a pattern verifier. The apparatus used to hold the disk and to move the medium relative to the heads, however, may be different.

Figure 2:
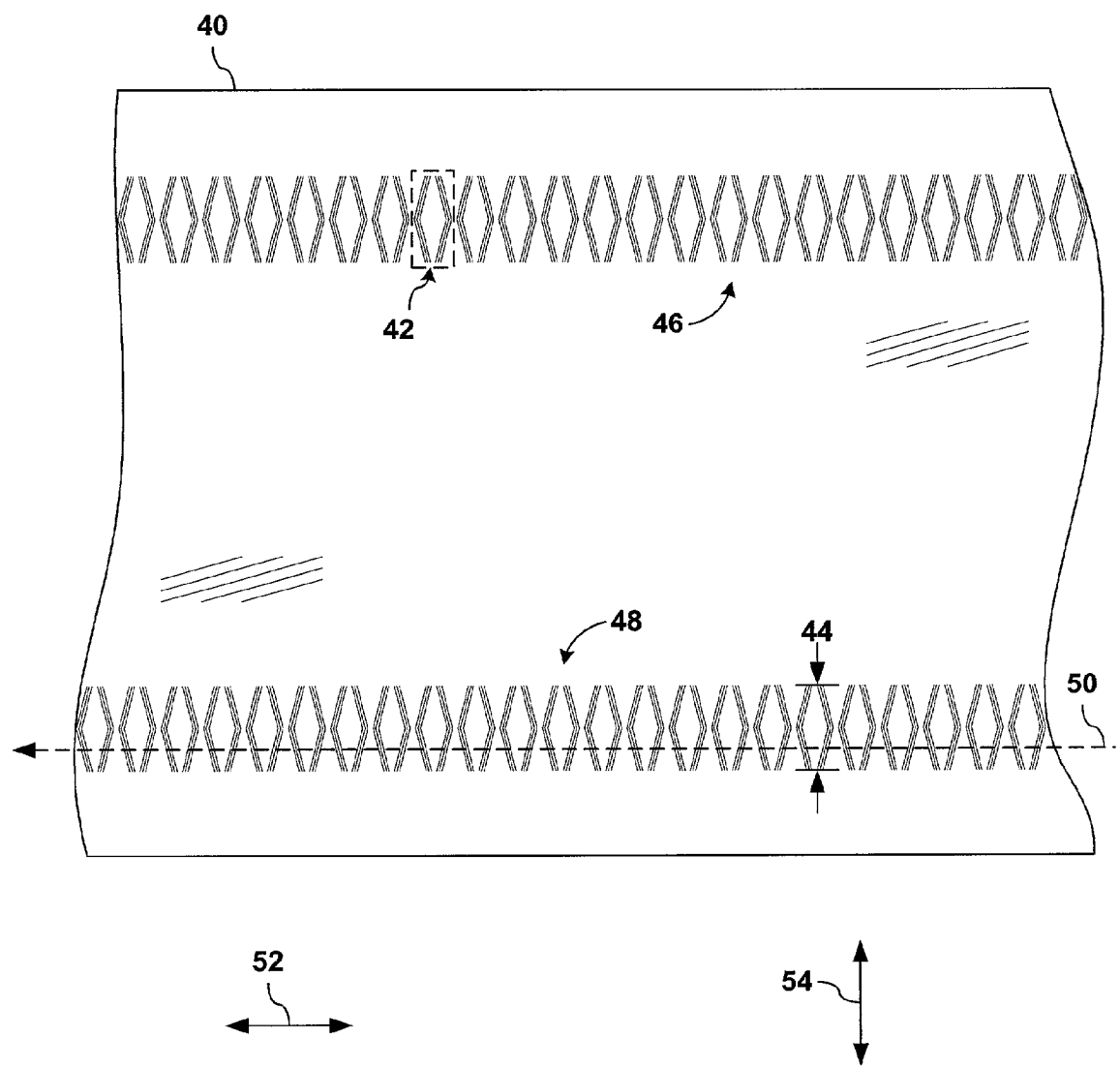
FIG. 2 is a plan view of exemplary servo marks on a magnetic medium.

FIG. 2 shows an illustrative arrangement of servo marks on magnetic medium 40. A typical servo mark is identified by reference numeral 42. Each servo mark includes two chevron-shaped marks. Two mirror-image chevrons form a diamond pattern. Each chevron-shaped mark is in turn composed of three stripes or "servo lines." Time-based servo marks may consist of one or more servo lines. The use of multiple servo lines may improve the quality of the signal that results when the servo pattern is sensed by a servo read head or by verify head 28.

Two bands 46 and 48 of servo marks are recorded on medium 40 in longitudinal direction 52. In ordinary use, a servo read head follows a band, such as band 48, and detects the patterns of the marks in the band. An illustrative path of a servo read head across band 48 is identified by reference numeral 50. A typical servo read head is narrower than width 44 of band 48.

As a servo read head encounters the servo marks, the servo read head generates a signal as a function of the marks. The timing between successive signals indicates the position of the servo read head with respect to medium 40. If the servo read head were to move in transverse direction 54, the timing between the signals would change.

Signals from the servo read head are typically received by a decoder, which measures the time between signals. Based upon the measurements, the decoder determines the position of the servo read head relative to medium 40. Once the position of the servo read head relative to medium 40 is known, a servo control system can position a transducer head in proximity to a desired data track.

The present invention may be implemented with magnetic marks recorded in a variety of shapes, sizes and arrangements. The arrangement of the marks in two bands 46 and 48, as shown in FIG. 2, is merely for the purpose of illustration. Time-based servo marks may be spaced more widely or more narrowly, may be arranged in more or fewer than two bands, or may be arranged on medium 40 in a configuration other than bands. The present invention can verify servo marks that are spaced in any manner or arranged in any configuration, including but not limited to the configuration depicted in FIG. 2.

Similarly, the chevron-shaped marks shown in FIG. 2 are merely an illustrative pattern of time-based servo marks. Time-based servo marks may appear in many other patterns, such as a K-shape, a V-shape or a zigzag. Time-based servo marks include at least one servo line that is "sloped," i.e., not parallel to longitudinal direction 52 or transverse direction 54. The sloped servo line or servo lines give rise to the change in timing of signals from the servo read head, depending upon the position of the servo read head relative to medium 40. The present invention can verify servo marks of any defined shape, including one or more servo lines of arbitrary slope, and is not limited to the shapes shown in FIG. 2.

In addition, each servo mark need not have the same number of servo lines. For example, one chevron-shaped mark may be composed of three servo lines, and a neighboring chevron-shaped mark may be composed of two servo lines. The present invention can verify servo marks having arbitrary numbers of servo lines.

Figure 3A:
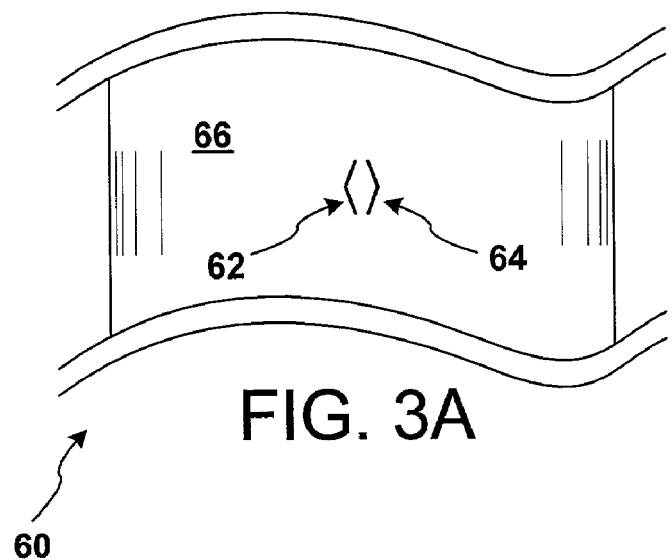
FIGS. 3A and 3B are, respectively, a partial top view and a side view of a record/verify head.
Figure 3B:
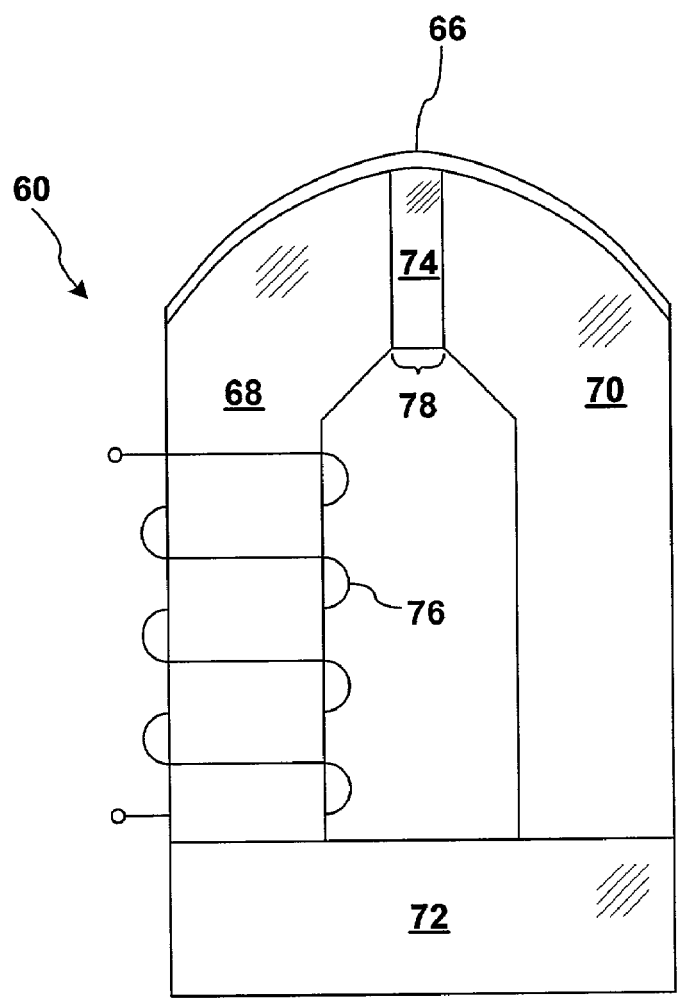

FIGS. 3A and 3B show, respectively, a partial top view and a side view of record/verify head 60 in accordance with the present invention. Record/verify head 60 may be used to record marks as well as to verify the marks. In practice, however, different heads may be used to perform each function.

Record/verify head 60 includes a C-shaped ferromagnetic core, shown as elements 68, 70 and 72. The core may be monolithically constructed, i.e., constructed from a single piece of ferromagnetic material, but is shown as core elements 68, 70 and 72 for clarity.

The core composed of core elements 68, 70 and 72 has core gap 78. Non-magnetic element 74 is disposed in core gap 78. Non-magnetic element 74 may be composed of ceramic or other non-magnetic material, and may be glass-bonded, glued or otherwise coupled to core elements 68 and 70.

Magnetically permeable film surface 66 is proximal to core elements 68 and 70 and to non-magnetic element 74. In a typical head, film surface 66 is affixed to core elements 68 and 70 and to non-magnetic element 74. Film surface 66 may be selected from many materials having a high wear tolerance and high magnetic moment density, such as iron nitride alloys. Alloys in this class can be applied by sputtering. The curvature of film surface 66 facilitates smooth contact between the magnetic medium and record/verify head 60. Film 66, core elements 68 and 70 and/or non-magnetic element 72 may include other structures, such as slots (not shown in FIG. 3) to channel trapped air when the medium passes by record/verify head 60.

As shown in FIG. 3A, flux gaps 62 and 64 have been formed in film surface 66. Flux gaps 62 and 64 are chevron-shaped, just like typical servo mark 42 shown in FIG. 2. Flux gaps 62 and 64, which penetrate through film surface 66, may be formed with great precision using photolithographic methods or other techniques. Flux gaps 62 and 64 are proximate to non-magnetic element 74. FIG. 3A is a partial top view. Record/verify head 60 may have several other sets of flux gaps (not shown in FIG. 3A) in film surface 66, or may be part of a head assembly as described below. Two sets of flux gaps, for example, would allow a single head to print two bands, such as bands 46 and 48 shown in FIG. 2, simultaneously.

Coil 76, wound around core element 68, energizes record/verify head 60. Current flowing through coil 76 causes magnetic flux to be generated in core elements 68, 70 and 72. Because of the high reluctance of non-magnetic element 74, little flux passes directly between core elements 68 and 70 through core gap 78. Flux does, however, permeate through magnetically permeable film 66. As the magnetic flux flows through film 66, the flux "leaks out" through flux gaps 62 and 64. As a result, a magnetic field in the same pattern as flux gaps 62 and 64 is created, which is recorded as magnetic transitions on the magnetic medium. In this manner, time-based servo marks of an arbitrary configuration may be recorded on a magnetic medium.

Record/verify head 60 can also verify recording of time-based servo marks, using the principle of magnetic recording reciprocity. The principle of magnetic recording reciprocity holds that current driven through a coil around a core may be used to generate a magnetic recording, and that a magnetic recording encountering the core may be used to induce a current in the coil. In other words, when a magnetic medium with a time-based servo mark passes record/verify head 60, the pattern of magnetization on the medium induces magnetic flux in surface film 66 and in core elements 68, 70 and 72. The flux through core element 68 in turn induces a current in coil 76. Because the voltage across coil 76 is proportional to the change in current through coil 76, it is also correct to say that the flux through core element 68 changes the voltage generated across coil 76.

The current induced in coil 76 and the voltage generated across coil 76 are a function of how closely the recorded pattern matches the patterns of flux gaps 62 and 64. If a time-based servo mark passes record/verify head 60 and the current induced in coil 76 or the voltage across coil 76 fails to have a predicted amplitude pattern or falls below a threshold amount, for example, the time-based servo mark may be deemed unsatisfactory.

Notably, record/verify head 60 can verify the entire width of a time-based servo mark, even though the servo mark consists of several line segments at angles from each other. A complete servo mark can be verified by a single record/verify head 60.

In this manner, a head used to record a time-based servo mark can also be used to verify that the servo mark has been made properly. In practice, the head used to record the servo mark will probably not be the same head that performs verification. Typically recording and verifying are performed by separate heads 26 and 28, as shown in FIG. 1. System 10 uses separate heads 26 and 28 to perform recording and verifying in a single pass.

In addition, a head used to record a time-based servo mark may be slightly altered from a head used to verify. For example, the coils of the two heads may differ in the number of turns around the ferromagnetic core. A verify head may use more turns to enhance current or voltage levels. Furthermore, the flux gaps on a verify head, while having substantially the same shape as the flux gaps in a recording head, may be slightly different from the shape as the flux gaps in the recording head. In addition, a recording head may use a single coil to energize the head and create several patterns at once, whereas a verify head may include separate coils for each pattern, to verify each pattern, or part of a single pattern, independently. Independent verification will be discussed in more detail below.

Figure 4A:
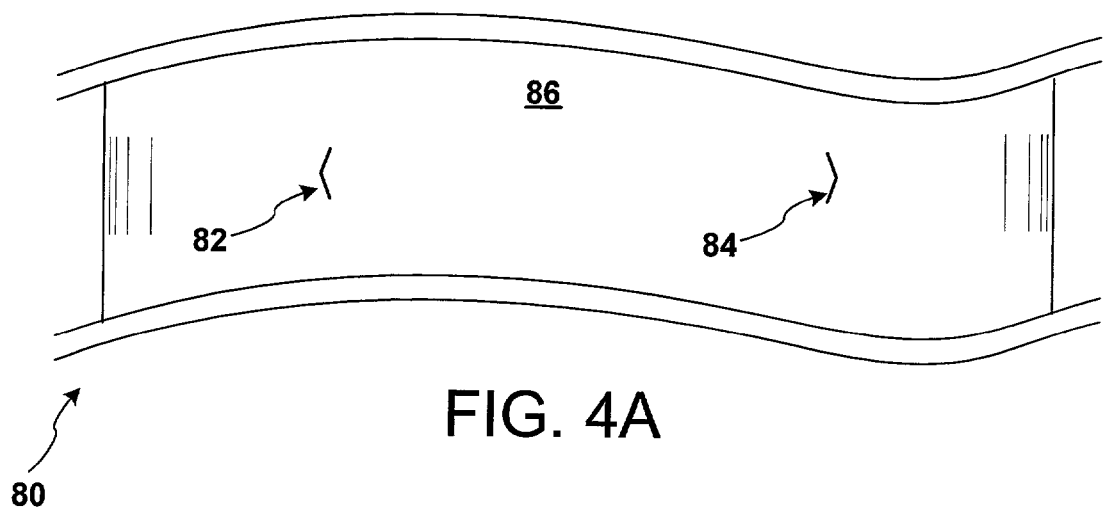
FIGS. 4A and 4B are, respectively, a partial top view and a side view of a verify head.
Figure 4B:
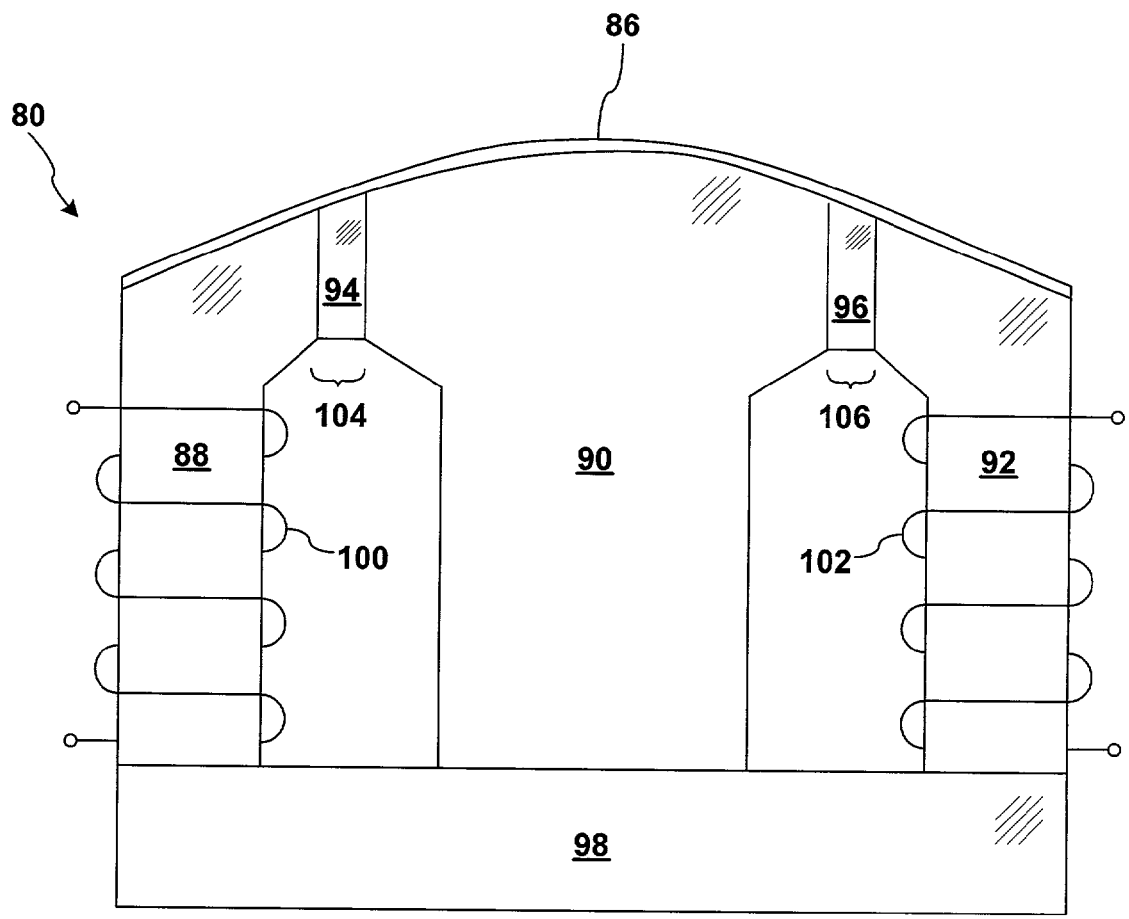

FIGS. 4A and 4B show, respectively, a partial top view and a side view of verify head 80 in accordance with the present invention. Verify head 80 includes two ferromagnetic cores, a first core composed of core elements 88, 90 and 98, and a second core composed of core elements 90, 92 and 98. The ferromagnetic cores are adjacent to one another, and the cores share common ferromagnetic elements 90 and 98. The ferromagnetic cores may be monolithic.

The core composed of core elements 88, 90 and 98 has core gap 104, which is filled by non-magnetic element 94. Similarly, the core composed of core elements 90, 92 and 98 has core gap 106, which is filled by non-magnetic element 96. Verify head 80 also includes magnetically permeable film surface 86. Verify head 80 is constructed in a similar manner to record/verify head 60.

Film surface 86 has chevron-shaped flux gaps 82 and 84. Unlike flux gaps 62 and 64 in FIGS. 3A and 3B, which were associated with a single core gap 78, flux gaps 82 and 84 are substantially separated. Flux gap 82 is associated with core gap 104 and is proximate to non-magnetic element 94, and flux gap 96 is associated with core gap 106 and is proximate to non-magnetic element 96.

In addition, verify head 80 includes two coils 100 and 102. The voltage generated across coil 100 is a function of the magnetically recorded pattern detected via flux gap 82, and the voltage generated across coil 102 is a function of the magnetically recorded pattern detected via flux gap 84.

Like record/verify head 60, verify head 80 can verify the entire width of a time-based servo mark. Each core in verify head 80, however, independently verifies a different part of the mark, with one core verifying the left half of the servo mark, and the other core verifying the right half of the servo mark.

Figure 8A:
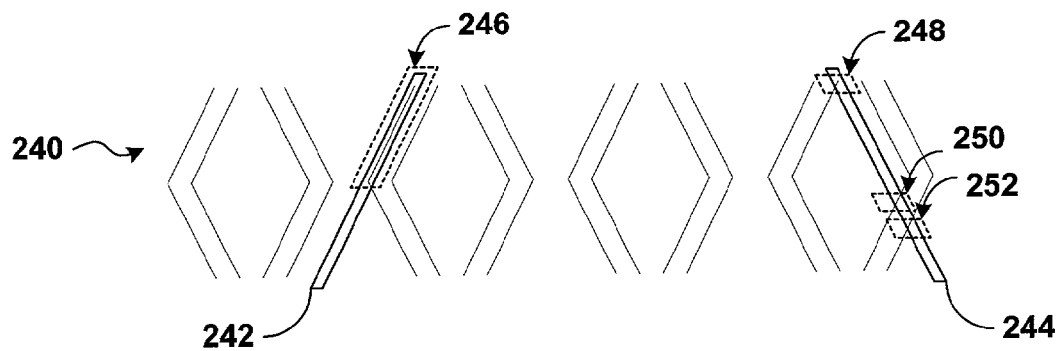
FIGS. 8A and 8B illustrate time-based servo marks in relation to flux gaps at different times.
Figure 8B:
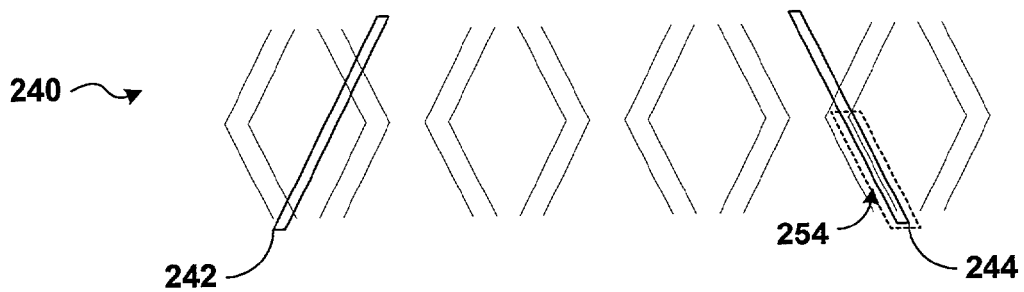

The different parts of the servo mark may be independently verified by the cores in other ways as well. For example, one core may verify segments of servo lines angled in one direction while the other core may verify segments of servo lines angled in the other direction, as illustrated in FIGS. 8A and 8B. It is also possible for one core to verify the top half of the servo mark while the other core verifies the bottom half of the servo mark. In ways such as these, a verify head may verify a part of the defined shape recorded on the medium by the recording head.

Figure 5A:
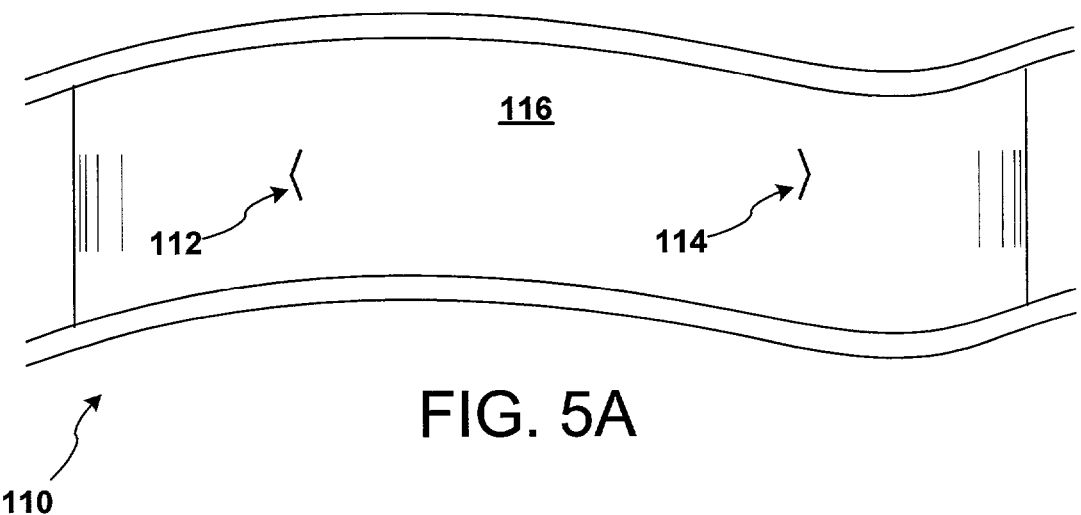
FIGS. 5A and 5B are, respectively, a partial top view and a side view of another verify head.
Figure 5B:
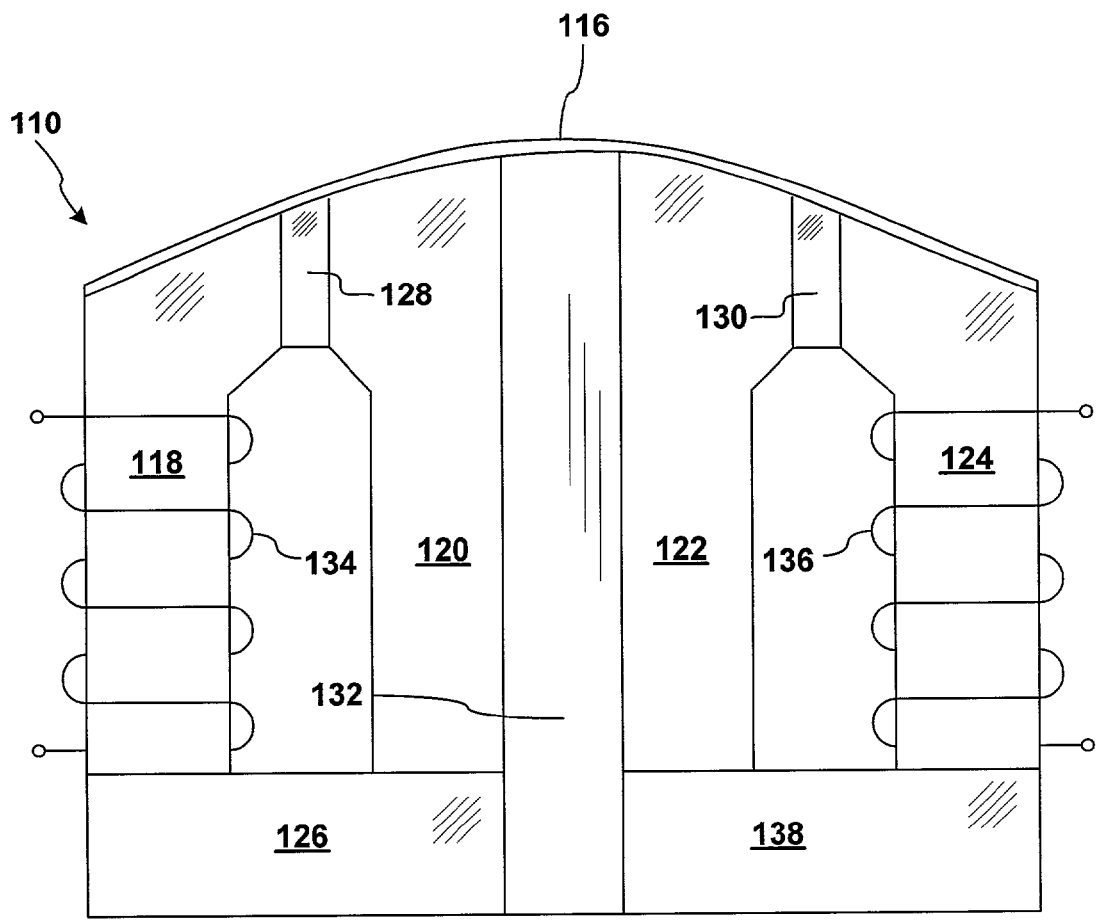

FIGS. 5A and 5B show, respectively, a partial top view and a side view of verify head 110 in accordance with the present invention. Verify head 110 is similar to verify head 80 in FIGS. 4A and 4B. Verify head 110 includes two adjacent ferromagnetic cores, a first core composed of elements 118, 120, and 126, and a second core composed of elements 122, 124, and 138. Each ferromagnetic core may be monolithic. Verify head 110 further includes non-magnetic elements 128 and 130, coils 134 and 136 and magnetically permeable film surface 116. Flux gaps 112 and 114 in surface 116 are separated, like flux gaps 82 and 84 of verify head 80. Verify head 110 is constructed in a similar manner to record/verify head 60 and verify head 80.

Unlike verify head 80, which included a center core element 90 shared by both cores, verify head 110 includes no shared core elements. The two cores are separated by non-magnetic spacer 132. Non-magnetic spacer 132 may be composed of many materials, such as ceramic, and may be composed of the same material as non-magnetic elements 128 and 130.

In FIGS. 5A and 5B, film surface 116 is shown as a single film surface proximal to both cores. In an alternative configuration, film surface 116 may be divided by non-magnetic spacer 132 into a set of two film surfaces. In this alternative configuration, the cores do not share a film surface.

Verify head 110 verifies time-based servo marks in essentially the same manner as verify head 80. The performance of verify head 110 may be superior to that of verify head 80, however, in that non-magnetic spacer 132 reduces cross-talk between the cores. The recorded pattern detected via flux gap 114, for example, is less likely to generate a voltage across coil 134 when non-magnetic spacer 132 is present.

Figure 6A:
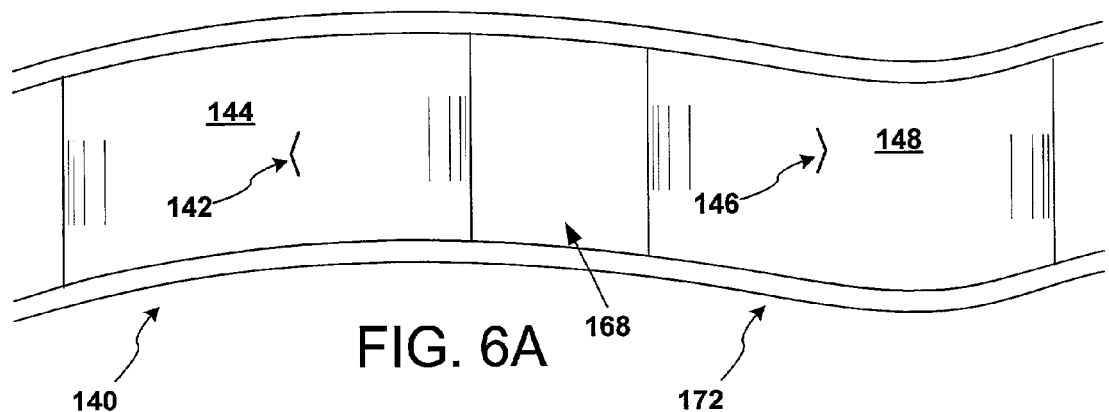
FIGS. 6A and 6B are, respectively, partial top views and side views of coordinated verify heads.
Figure 6B:
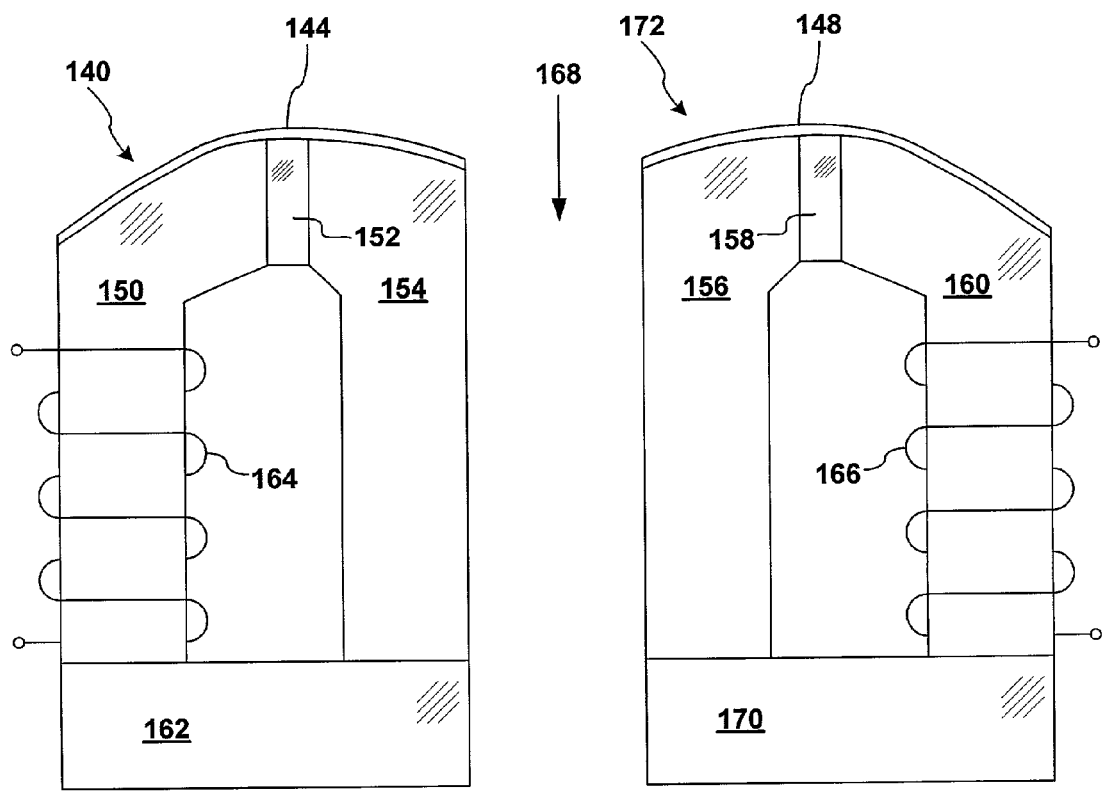

FIGS. 6A and 6B show, respectively, a partial top view and a side view of verify heads 140 and 172 in accordance with the present invention. Verify heads 140 and 172 each include a ferromagnetic core, with the cores separated by space 168. One core includes ferromagnetic elements 150, 154 and 162 and also includes non-magnetic element 152. The other core includes ferromagnetic elements 156, 160 and 170 and non-magnetic element 158. Each core may be monolithically constructed. Although shown as separate, verify heads 140 and 172 may be coupled to each other, for example, by being mounted to a non-magnetic element (not shown in FIGS. 6A and 6B).

Verify heads 140 and 172 are similar to verify head 110 and operate in virtually the same way as verify head 110. The recorded pattern detected via flux gap 142 generates a voltage across coil 164, and the recorded pattern detected via flux gap 146 generates a voltage across coil 166.

In contrast to verify head 110, which separated the cores with non-magnetic spacer 132, the cores of verify heads 140 and 172 are separated by space 168. Space 168 may include air or other medium with low permeability. Space 168 operates like non-magnetic spacer 132 and electromagnetically isolates one coil from the other. Unlike verify head 110, which has continuous magnetically permeable surface 116, magnetically permeable surface 144 and 148 is discontinuous at space 168. In other words, verify heads 140 and 172 each include magnetically permeable film surfaces 144 and 148, one for each core. The performance of verify heads 140 and 172 may be superior to that of verify head 110, however, in that space 168 reduces cross-talk more effectively than spacer 132.

Notably, verify heads 140 and 172 are also like record/verify head 60. Record/verify head 60, however, has two flux gaps 62 and 64, representing the full servo mark pattern. Verify heads 140 and 172, by contrast, each have a single flux gap 142 and 146, respectively. In operation, each head 140 or 172 verifies a fraction of the servo mark rather than the entire servo mark.

Figure 7:
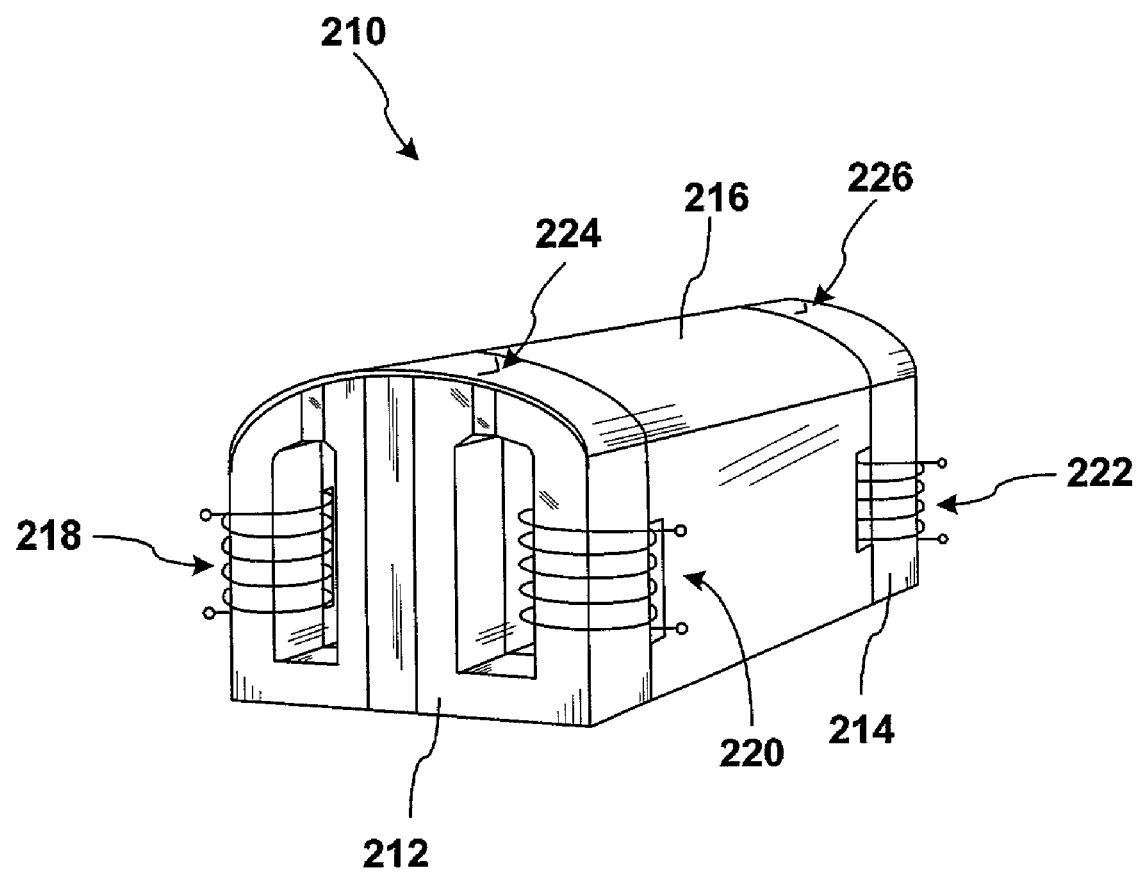
FIG. 7 is a perspective view of a verifier head assembly.

FIG. 7 shows a perspective view of verify head assembly 210. Verify head assembly 210 includes an array of independent verify heads 212 and 214. Heads 212 and 214 are configured like verify head 110 shown in FIGS. 5A and 5B. Any of the heads described above may be included in a verify head assembly.

Heads 212 and 214 are affixed to and separated transversely by non-magnetic spacer 216. Heads 212 and 214 operate independently of one another. Moreover, each core in a head operates independently. Head 212 includes coils 218 and 220. The voltage generated across coil 220 is a function of the pattern detected via flux gap 224. The voltage generated across coil 218 a function of the pattern detected via a second flux gap (not shown in FIG. 7).

Similarly, the voltage generated across coil 222 is a function of the pattern detected via third flux gap 226. Head 214 has a fourth flux gap and a fourth coil (not shown in FIG. 7). Consequently, verify head assembly 210 may generate four independent signals in four independent coils when verifying patterns on a single magnetic medium.

Spacer 216 is sized so that verify head assembly 210 can verify servo marks at different sites on the magnetic media simultaneously. For example, verify head assembly 210 can simultaneously verify servo mark bands 46 and 48 shown in FIG. 2, which are separated transversely from one another. A particular magnetic medium may include servo marks at more than two sites, and therefore more than two heads may be included in a verify head assembly.

FIG. 8A illustrates another embodiment of the invention. FIGS. 8A and 8B illustrate time-based servo marks 240 in relation to flux gaps 242 and 244 at different times. Unlike the chevron-shaped flux gaps in previous examples, flux gaps 242 and 244 are angled in different directions.

At a first time shown in FIG. 8A, flux gap 242 has substantial matching overlap 246 with the upper half of a time-based servo mark. Because the voltage generated across a verify head coil (not shown in FIGS. 8A and 8b) is a function of how closely the recorded pattern matches the patterns of flux gap 242, overlap 246 results in the generation of a large signal. At the same time, flux gap 244 has overlaps 248, 250 and 252, but the recorded patterns at the points of overlap do not match flux gap 244 closely. Accordingly, overlaps 248, 250 and 252 result in the generation of small signals.

After a period of time, time-based servo marks 240 move relative to flux gaps 242 and 244 to the position shown in FIG. 8B. In FIG. 8B, flux gap 244 has substantial matching overlap 254 with the lower half of a time-based servo mark, resulting in the generation of a large signal. Flux gap 242, by contrast, lacks substantial overlap and does not generate a large signal.

Flux gaps 242 and 244 can verify part of a servo mark at one time, rather than the full mark. Even so, flux gaps implemented as angled lines in different directions may have advantages over chevron-shaped flux gaps. In particular, angled line flux gaps are less sensitive than chevron-shaped flux gaps to variations in the transverse position of the verify head relative to the time-based servo marks.

Figure 8C:
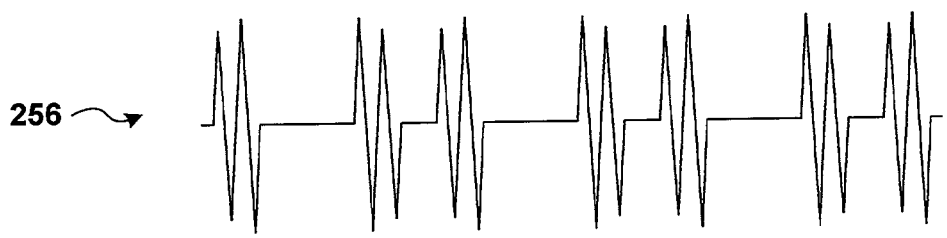
FIG. 8C illustrates exemplary signals generated by the interaction of the servo marks and flux gaps in FIGS. 8A and 8B.
Figure 8C:
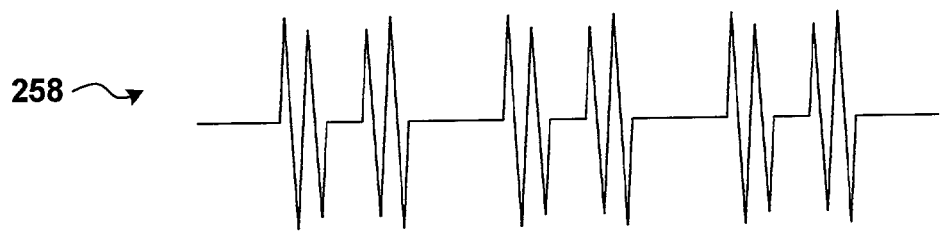

FIG. 8C shows example signals as a function of time. Signal 256 results from the interaction of time-based servo marks 240 with flux gap 242, and signal 258 results from the interaction of time-based servo marks 240 with flux gap 244. The peaks of signals 256 and 258 correspond to the times that the patterns of time-based servo marks 240 most closely match flux gaps 242 and 244, respectively. Therefore, the peaks of signals 256 and 258 correspond directly to the positions of the marks. By analysis of the timing of the peaks, time-based servo marks 240 can be verified for pattern, position, amplitude, dropout rate and consistency.

The verify head or verify heads used to verify time-based servo marks 240 may be constructed in a similar manner to verify heads described above. Because flux gaps 242 and 244 are substantially straight lines, however, the verify head or verify heads may also be constructed without a magnetically permeable film surface. Flux gaps 242 and 244 may be defined by core gaps in the ferromagnetic core.

A number of embodiments of the present invention have been described. Nevertheless, various modifications may be made without departing from the scope of the invention. For example, the patterns described above have consisted of two mirror-image chevron shapes and differently angled lines, but may incorporate alternative shapes. Time-based servo patterns may incorporate three or more different lines and shapes. Accordingly, a verify head may include three or more adjacent cores, each core including a core gap and associated with a flux gap. Each core may be electromagnetically isolated from its neighbors with a non-magnetic spacer or a space. These and other embodiments are within the scope of the following claims.

The invention claimed is:

1. A device comprising:
   a first ferromagnetic core including a first core gap;
   a second ferromagnetic core separated from the first ferromagnetic core by a space, the second ferromagnetic core including a second core gap;
   a first magnetically permeable surface proximate to the first ferromagnetic core; and
   a second magnetically permeable surface proximate to the second ferromagnetic core, wherein the first magnetically permeable surface includes a first flux gap associated with the first core gap and the second magnetically permeable surface includes a second flux gap associated with the second core gap, wherein the first flux gap and the second flux gap define at least a portion of a time-based servo pattern and wherein the first flux gap is at least partially non-parallel to the second flux gap.

2. The device of claim 1, further comprising:
   a first non-magnetic element disposed in the first core gap; and
   a second non-magnetic element disposed in the second core gap.

3. The device of claim 1, further comprising:
   a first coil wound on the first ferromagnetic core; and
   a second coil wound on the second ferromagnetic core.

4. The device of claim 1, wherein the first ferromagnetic core and the second ferromagnetic core are monolithic.

5. The device of claim 1, further comprising a non-magnetic spacer disposed between the first ferromagnetic core and the second ferromagnetic core.

6. The device of claim 1, wherein the fist and second ferromagnetic cores comprise C-cores that are separated by the space.

7. The device of claim 1, wherein the first flux gap and the second flux gap substantially define at least a portion of a chevron-shaped time-based servo pattern.

8. The device of claim 1, wherein the first flux gap substantially corresponds to a shape of a first time-based servo mark recorded on a magnetic medium, and wherein the second flux gap substantially corresponds to a shape of a second time-based servo mark recorded on the magnetic medium, the first and second time-based servo marks being at least partially non-parallel to one another.

9. A method comprising:
   recording a time-based servo pattern to a magnetic medium using a recording head, the recording head including a first surface patterned with a first set of flux gaps to define a defined shape that corresponds to the time-based servo pattern; and
   sensing the time-based servo pattern on the magnetic medium using a verify head, the verify head including a second surface patterned with a second set of flux gaps to define substantially the defined shape that corresponds to the time-based servo pattern wherein the recording head and the verify head are substantially identical in construction,
   wherein the defined shape comprises at least one first portion that is neither parallel to a path of the medium past the heads nor a direction transverse to the path of the medium past the heads and at least one second portion that is at least partially non-parallel to the first portion.

10. The method of claim 9, wherein the recording head and the verify head include coils, and wherein the verify head includes a coil with more turns than the recording lead.

11. The method of claim 9, wherein the magnetic medium is selected from the group consisting of magnetic tape and magnetic disks.

12. A system comprising:
   a recording head, the recording head including a first surface comprising a first set of flux gaps that form a first defined shape, wherein the first defined shape corresponds to at least a portion of a time-based servo pattern; and a verify head, the verify head including a second surface comprising a second set of flux gaps that form a second defined shape substantially similar to the first defined shape of the first set of flux gaps in the record head, wherein each of the first and second defined shapes comprise at least one first portion that is neither parallel to a path of a magnetic medium past the heads nor a direction transverse to the path of the magnetic medium past the heads and at least one second portion that is at least partially non-parallel to the first portion.

13. The system of claim 12, comprising a magnetic medium brought in proximity to the recording head and the verify head.

14. The system of claim 13, wherein the magnetic medium is selected from the group consisting of magnetic tape and magnetic disks.

15. The system of claim 12, wherein the recording head includes a recording coil, the system further comprising:
 a driver coupled to the recording head that causes current to flow in the recording coil; and
 a controller that regulates the driver.

16. The system of claim 12, wherein the verify head includes at least two verifying coils, the system further comprising:
 an amplifier that receives at least one of currents and voltages from the verifying coils and generates an amplified signal; and
 a pattern verifier that receives the amplified signal.

17. The system of claim 12, wherein the first and second defined shapes comprises one of a chevron shape, a K-shape, a V-shape or a zigzag.

18. A device comprising:
 a first ferromagnetic core having a first core gap;
 a second ferromagnetic core having a second core gap;
 a first magnetically permeable surface proximate to the first ferromagnetic core having a first flux gap associated with the first core gap, the first flux gap having a first defined shape; and
 a second magnetically permeable surface proximate to the second ferromagnetic core having a second flux gap associated with the second core gap, the second flux gap having a second defined shape, the second defined shape being distinct from the first defined shape in at least one of contour and orientation such that the first and second flux gaps collectively define a time-based servo pattern to be created on a magnetic medium.

19. The device of claim 18, wherein the first ferromagnetic core and the second ferromagnetic core share a core element.

20. The device of claim 18, wherein the first flux gap substantially corresponds to the shape of a first time-based servo mark recorded on the magnetic medium, and wherein the second flux gap substantially corresponds to the shape of a second time-based servo mark recorded on the magnetic medium.

21. The device of claim 18, further comprising:
 a first non-magnetic element disposed in the first core gap; and
 a second non-magnetic element disposed in the second core gap.

22. The device of claim 18, further comprising:
 a first coil wound on the first ferromagnetic core; and
 a second coil wound on the second ferromagnetic core.

23. A system comprising:
 a recording head, the recording head including a first surface comprising a first set of flux gaps that form a defined shape, wherein the defined shape corresponds to at least a portion of a time-based servo pattern; and
 a first verify head, the first verify head including a second surface comprising a first flux gap that defines a first part of the defined shape; and
 a second verify head the second verify head including a third surface that defines a second part of the defined shape,
 wherein the defined shape comprises at least one first portion that is neither parallel to a path of a magnetic medium past the heads nor a direction transverse to the path of the magnetic medium past the heads and at least one second portion that is at least partially non-parallel to the first portion.

24. The system of claim 23, comprising a magnetic medium brought in proximity to the recording head and the verify head, the magnetic medium selected from the group consisting of magnetic tape and magnetic disks.

* * * * *